United States Patent
Tien et al.

(10) Patent No.: US 8,899,812 B2
(45) Date of Patent: Dec. 2, 2014

(54) FRONT BEZEL ASSEMBLY WITH BACKLIGHT SOURCE, NON-SELF-LUMINOUS DISPLAY DEVICE WITH BACKLIGHT SOURCE IN FRONT BEZEL, AND METHOD FOR INSTALLING THE BACKLIGHT SOURCE THEREOF

(75) Inventors: Cheng-Hua Tien, New Taipei (TW); Tian-Yu Yeh, New Taipei (TW); Tai-Yu Chen, New Taipei (TW); Chueh-Yang Tsai, New Taipei (TW)

(73) Assignee: Wistron Corporation, New Taipei (TW)

( * ) Notice: Subject to any disclaimer, the term of this patent is extended or adjusted under 35 U.S.C. 154(b) by 288 days.

(21) Appl. No.: 13/478,140

(22) Filed: May 23, 2012

(65) Prior Publication Data
US 2012/0300434 A1    Nov. 29, 2012

(30) Foreign Application Priority Data
May 24, 2011 (TW) .............. 100118110 A (51) Int. Cl.
 F21V 19/04 (2006.01)
 G02F 1/1335 (2006.01)
 G02F 1/1333 (2006.01)
 F21V 19/00 (2006.01)

(52) U.S. Cl.
 CPC .... G02F 1/133608 (2013.01); G02F 1/133308 (2013.01); G02F 2001/13332 (2013.01)
 USPC ............ 362/612; 362/632; 362/633; 362/634

(58) Field of Classification Search
 CPC .............. G02F 1/133608; G02F 1/133308
 USPC ........ 362/97.1–97.4, 367, 611–612, 632–634
 See application file for complete search history.

(56) References Cited

U.S. PATENT DOCUMENTS

| 8,467,009 B2 | 6/2013 | Lin et al. |
| 2008/0100775 A1 | 5/2008 | Hsiao |
| 2011/0019122 A1* | 1/2011 | Lin et al. .................. 349/58 |

FOREIGN PATENT DOCUMENTS

| CN | 101968579 A | 2/2011 |
| TW | 200821680 A | 5/2008 |

OTHER PUBLICATIONS

Office Action issued to Taiwanese Counterpart Application No. 100118110 on dated Jan. 17, 2014. English summary provided by Saint Island Intellectual Property Co., Ltd.
Office Action of Chinese Counterpart Patent Application No. 201110157134.0 issued on May 29, 2014 and partial English translation indicated by boxed section of Chinese Office Action.

* cited by examiner

*Primary Examiner* — Karabi Guharay
*Assistant Examiner* — Nathaniel Lee
(74) *Attorney, Agent, or Firm* — Harness, Dickey & Pierce, PLC (57) ABSTRACT

A front bezel assembly is adapted to cover a display panel and a backlight module of a non-self-luminous display device. The backlight module includes an optical module. The front bezel assembly includes a front bezel. The front bezel assembly includes a front wall disposed in front of the display panel and formed with a bezel opening to expose the same, and a sidewall extending rearward from the front wall into the optical module. A backlight source is mounted to the sidewall such that light emitted from the backlight source irradiates toward the display panel through the optical module.

4 Claims, 9 Drawing Sheets

FRONT BEZEL ASSEMBLY WITH BACKLIGHT SOURCE, NON-SELF-LUMINOUS DISPLAY DEVICE WITH BACKLIGHT SOURCE IN FRONT BEZEL, AND METHOD FOR INSTALLING THE BACKLIGHT SOURCE THEREOF

CROSS REFERENCE TO RELATED APPLICATION

This application claims priority of Taiwanese Patent Application No. 100118110, filed on May 24, 2011, the disclosure of which is incorporated herein by reference.

BACKGROUND OF THE INVENTION

1. Field of the Invention

The invention relates to a front bezel assembly of a non-self-luminous display device, more particularly to a front bezel assembly with a backlight source, a non-self-luminous display device with the backlight source in the front bezel assembly, and a method for installing the backlight source thereof.

2. Description of the Related Art

Figure 1:
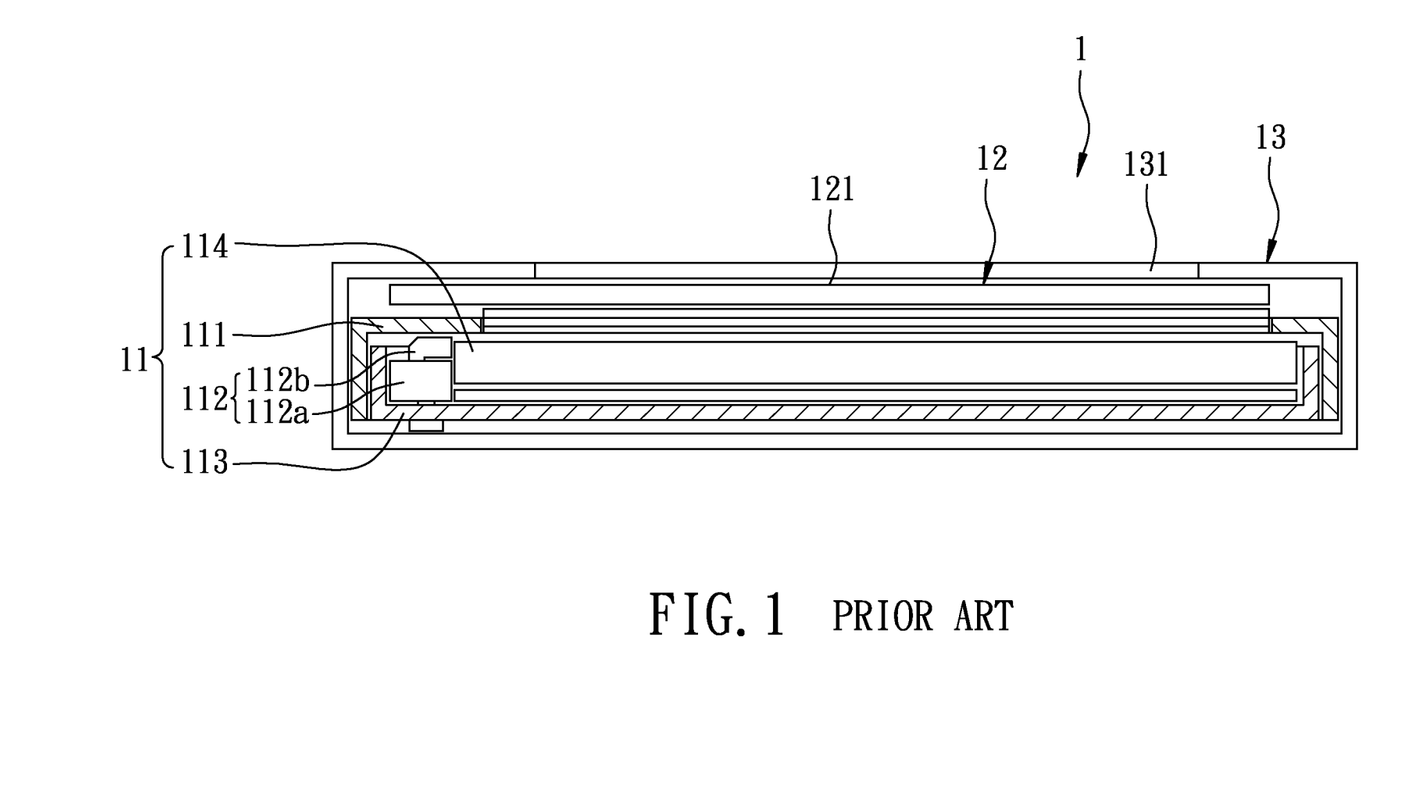
FIG. 1 is a sectional view of a conventional liquid crystal display.
Figure 2:
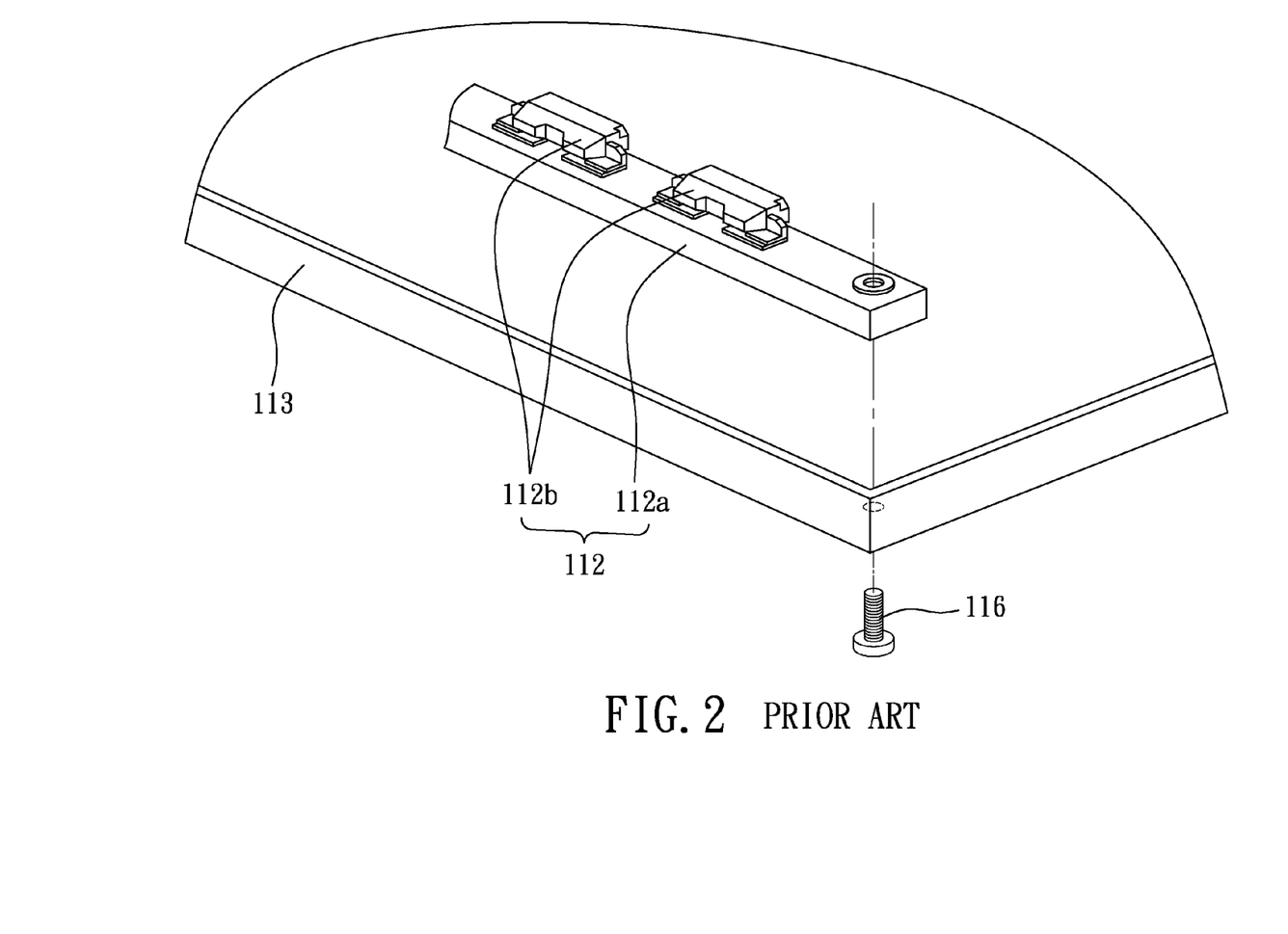
FIG. 2 is a fragmentary perspective view of the conventional liquid crystal display.

Referring to FIGS. 1 and 2, a conventional liquid crystal display 1 includes a backlight module 11, a liquid crystal display panel 12 having a display region 121, and a front bezel 13 having an opening 131.

The backlight module 11 includes a front frame 111, a backlight source 112, a backboard 113, and an optical module 114 disposed on the backboard 113.

The backlight source 112 includes a printed circuit board (PCB) (112a) and a plurality of light emitting diodes (LEDs) (112b) disposed on and coupled electrically to the printed circuit board (112a). The backlight source 112 is disposed on one side of the backboard 113 in proximity to the optical module 114, and is fixed to the backboard 113 by using a plurality of screws 116 (only one is shown in FIG. 2).

The liquid crystal display panel 12 is disposed on the backlight module 11. The front bezel 13 covers the backlight module 11 and the liquid crystal display panel 12 such that the display region 121 of the liquid crystal display panel 12 is exposed via the opening 131 in the front bezel 13.

However, because the backlight source 112 is fixed to the backboard 113, when the light emitting diode (112b) inside the backlight module 11 is damaged and needs replacement, the front bezel 13 must be removed first, followed by the front frame 111 of the backlight module 11, before the damaged light emitting diode (112b) can be removed from the backboard 113 of the backlight source 112 and then replaced with a new one. Hence, the method of removing and installing the backlight source 112 from and to the backboard 113 is troublesome, causing inconveniences to the manufacturers or users.

From the above description, it is apparent that there is a need to provide the manufacturers or users with an easy method to facilitate removal and installation of the backlight source of the liquid crystal display.

SUMMARY OF THE INVENTION

Therefore, an object of the present invention is to provide a front bezel assembly with a backlight source.

Another object of the present invention is to provide a non-self-luminous display device with a backlight source in a front bezel assembly.

Yet another object of the present invention is to provide a method for installing a backlight source in a non-self-luminous display device.

According to one aspect of this invention, a front bezel assembly is adapted to cover a display panel and a backlight module of a non-self-luminous display device. The front bezel assembly comprises a front bezel and a backlight source. The front bezel includes a front wall formed with a bezel opening adapted to expose the display panel, and a sidewall. The sidewall extends rearward from one end of the front wall that is distal from the bezel opening toward the backlight module and through the backlight module. The backlight source is mounted to the sidewall such that light emitted from the backlight source irradiates toward the display panel through the backlight module.

According to another aspect of this invention, a non-self-luminous display device comprises a backlight module, a display panel and a front bezel assembly. The front bezel assembly includes a front bezel and a backlight source. The display panel is mounted to a front side of the backlight module. The front bezel includes a front wall formed with a bezel opening to expose the display panel, and a sidewall. The sidewall extends rearward from the front wall into the backlight module. The front bezel of the front bezel assembly engages with the backlight module. The backlight source is mounted to the sidewall such that light emitted from the backlight source irradiates toward the display panel through the backlight module.

According to yet another aspect of this invention, a method for assembling a backlight source in a non-self-luminous display device comprises the steps of: (a) mounting a display panel to a backlight module; (b) providing a front bezel having a front wall formed with a bezel opening and a sidewall extending rearward from the front wall; (c) mounting the backlight source to the sidewall; and (d) engaging the sidewall into the backlight module and fixing the sidewall to the backlight module to expose the display panel through the bezel opening.

The advantage of the present invention resides in providing easy removal and installation of the backlight source in the non-self-luminous display device.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE PREFERRED EMBODIMENTS

The above-mentioned and other technical contents, features, and effects of this invention will be clearly presented from the following detailed description of two embodiments in coordination with the reference drawings.

Before this invention is described in detail, it should be noted that, in the following description, similar elements are designated by the same reference numerals.

Figure 3:
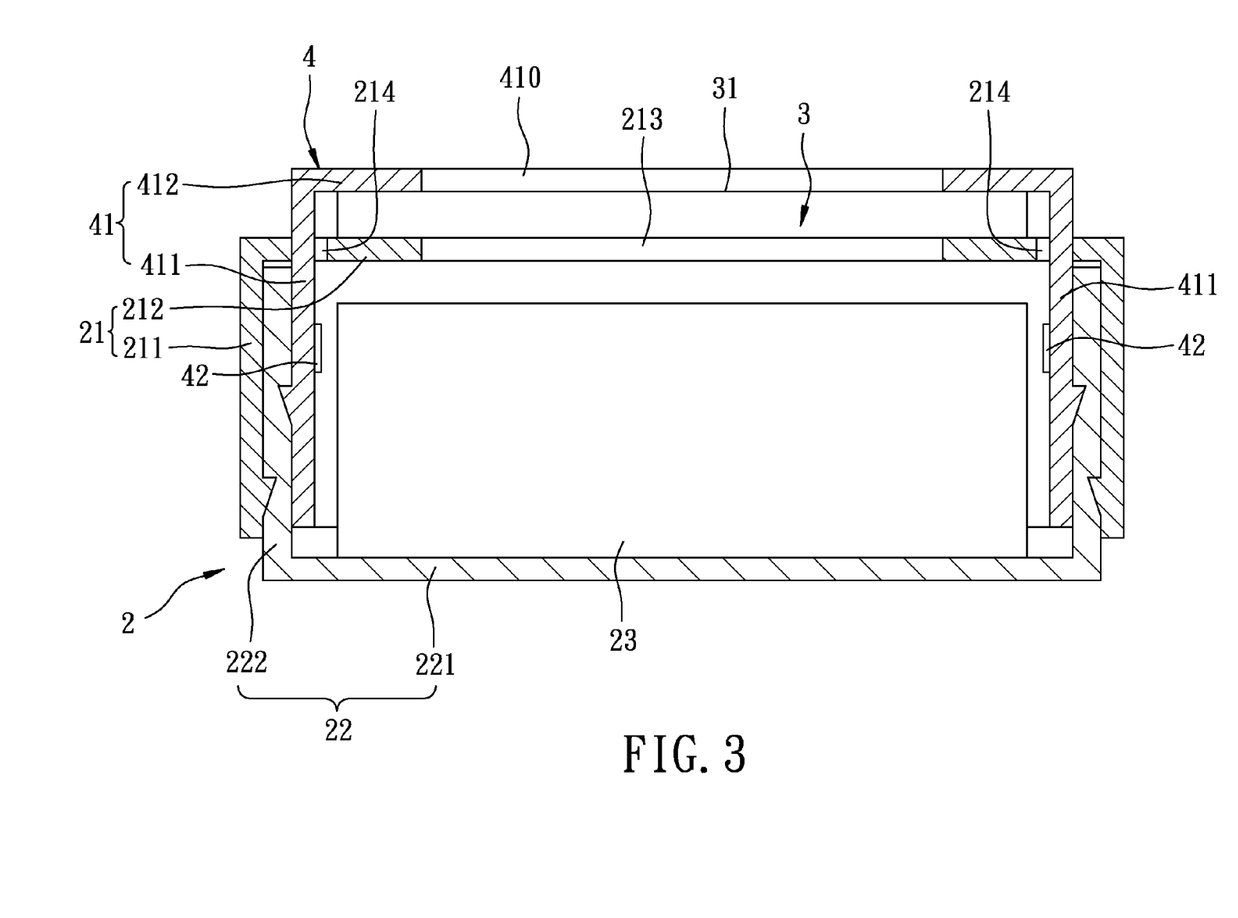
FIG. 3 is a sectional view of a non-self-luminous display device according to the first embodiment of this invention.
Figure 4:
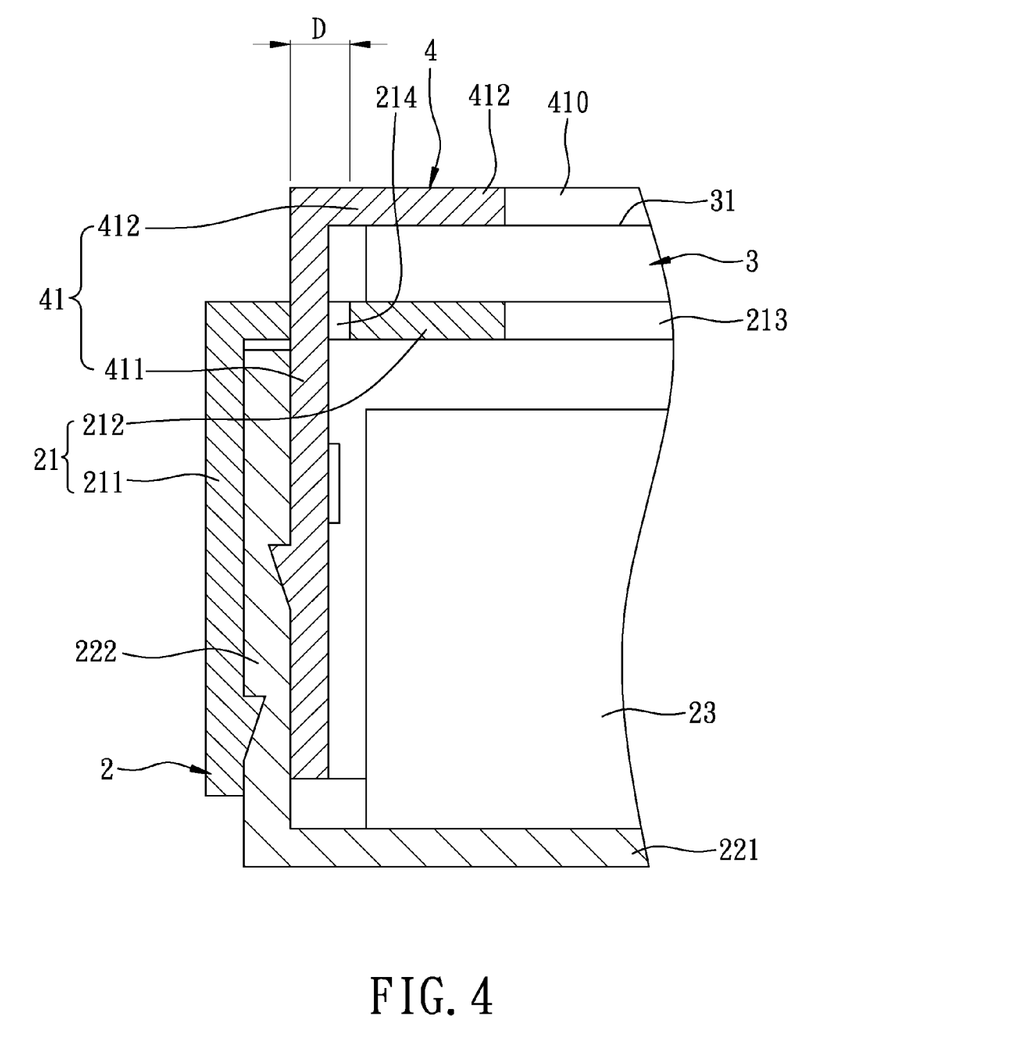
FIG. 4 is a fragmentary enlarged sectional view of the first embodiment.

Referring to FIGS. 3 and 4, a non-self-luminous display device according to the first embodiment of the present invention is shown to comprise a backlight module 2, a display panel 3, and a front bezel assembly 4. In this embodiment, the display panel 3 may be a liquid crystal display.

The backlight module 2 includes an optical module 23, a front frame 21, and a backboard 22. The front frame 21 includes a frame surrounding wall 211 and a front wall 212 extending inwardly from the frame surrounding wall 211 to form a frame opening 213. The backboard 22 has a back wall 221, and a backboard surrounding wall 222 extending frontward from the back wall 221. The optical module 23 is mounted on the backboard 22.

The display panel 3 has a display region 31, and is mounted on the front wall 212 of the front frame 21 to cover the frame opening 213.

The front bezel assembly 4 includes a front bezel 41 and a backlight source 42. The front bezel 41 includes a front wall 412 formed with a bezel opening 410 to reveal the display region 31 of the display panel 3, and a sidewall 411 extending rearward from one end of the front wall that is distal from the bezel opening toward the backlight module and through the backlight module. The backlight source 42 is mounted on the sidewall 411.

The backboard surrounding wall 222 is sandwiched between the frame surrounding wall 211 and the sidewall 411 of the front bezel 41, and the sidewall 411 engaged with the backboard surrounding wall 222. The backlight source 42 is mounted on the sidewall 411 so that light emitted from the backlight source 42 irradiates toward the display panel 3 through the optical module 23. In this embodiment, the interconnection among the frame surrounding wall 211, the backboard surrounding wall 222, and the sidewalls 411 of the front bezel 41 may be realized by using any suitable interlocking means or screw fastening method.

In this embodiment, the front wall 212 of the front frame 21 further formed a spaced-apart slot 214 between the frame surrounding wall 211 and the frame opening 213. The slots 214 have a width (D) that is sufficiently sized to permit the sidewall 411 of the front bezel 41 to move in and out of the front frame 21 of the backlight module 2.

Figure 5:
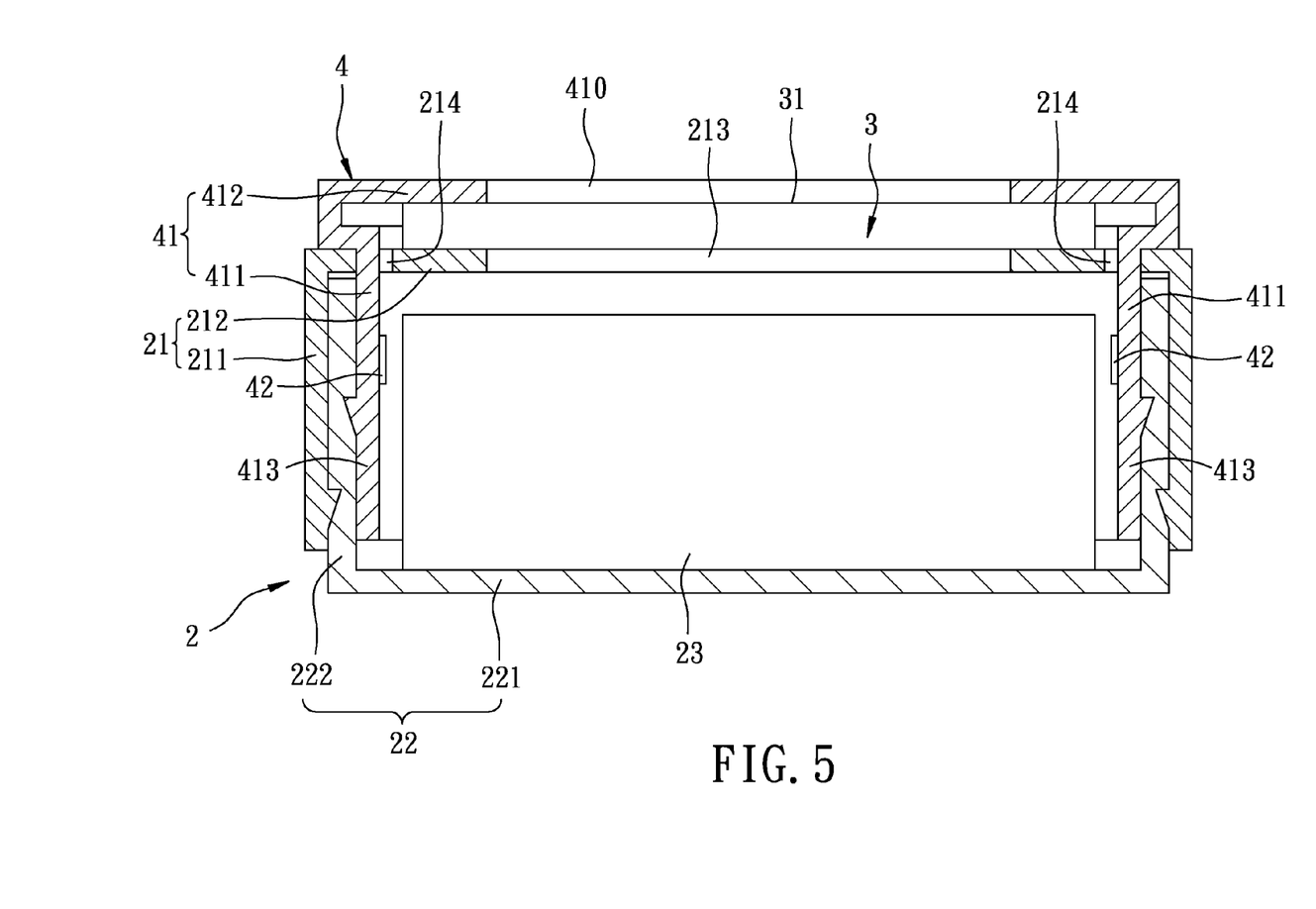
FIG. 5 is a sectional view of a non-self-luminous display device according to the second embodiment of this invention.
Figure 6:
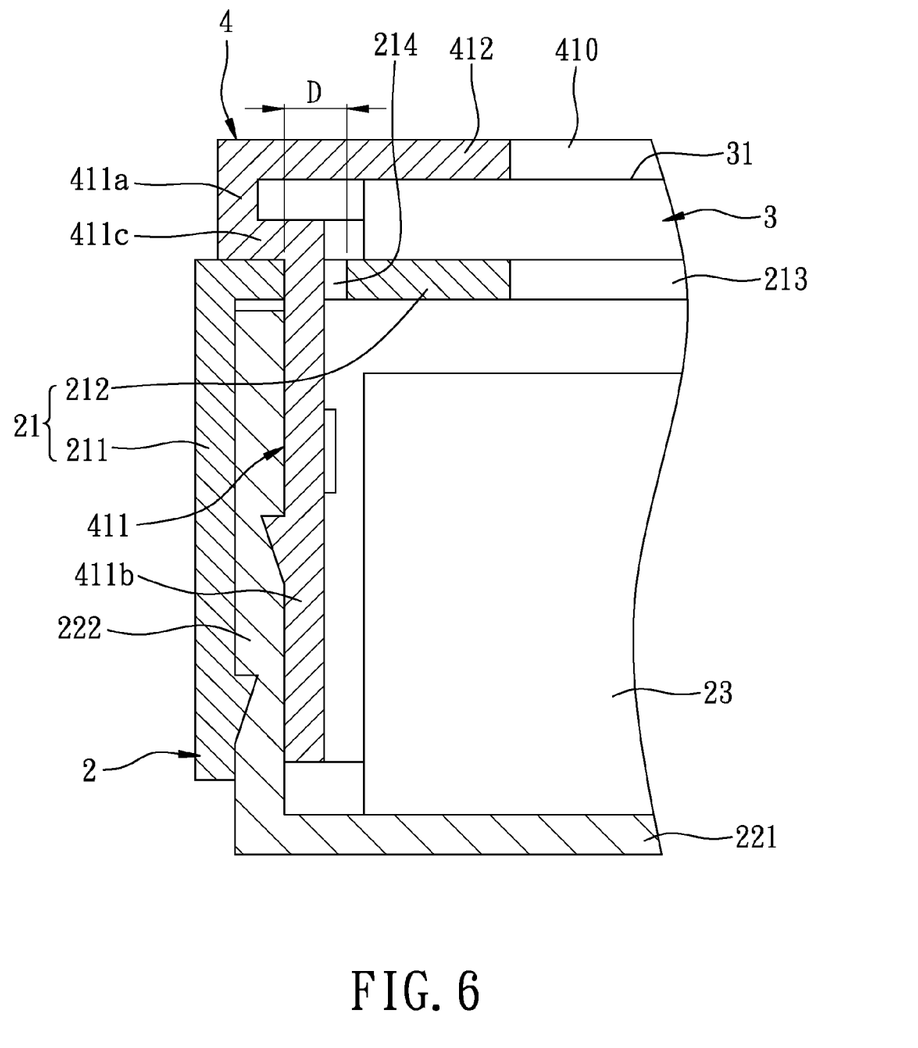
FIG. 6 is a fragmentary enlarged sectional view of the second embodiment.

Referring to FIGS. 5 and 6, a non-self-luminous display device according to the second embodiment of this invention is shown. This embodiment is mainly different from the first embodiment in the sidewall 411. The sidewall 411 of the front bezel 41 includes a first part (411a) extending from one end of the front wall 412 to the front wall 212 of the front frame 21, a second part (411b) extending through the front wall 212 of the front frame 21, and a third part (411c) connecting the first part (411a) and the second part (411b). The third part (411c) extends from one end of the first part (411a) toward the display panel 3 and connects one end of the second part (411b).

The display panel 3 is thus sandwiched between the front wall 412 of the front bezel 41 and the front wall 212 of the front frame 21. The backboard surrounding wall 222 is sandwiched between the frame surrounding wall 211 and the second part (411b) of the sidewall 411 of the front bezel 41. The second part (411b) of the sidewall 411 engages with the backboard surrounding wall 222. The backlight source 42 is mounted to the second part (411b) of the sidewall 411.

A method for assembling the backlight source in the non-self-luminous display device of the second embodiment is described hereinafter with reference to FIGS. 7 to 11.

Figure 7:
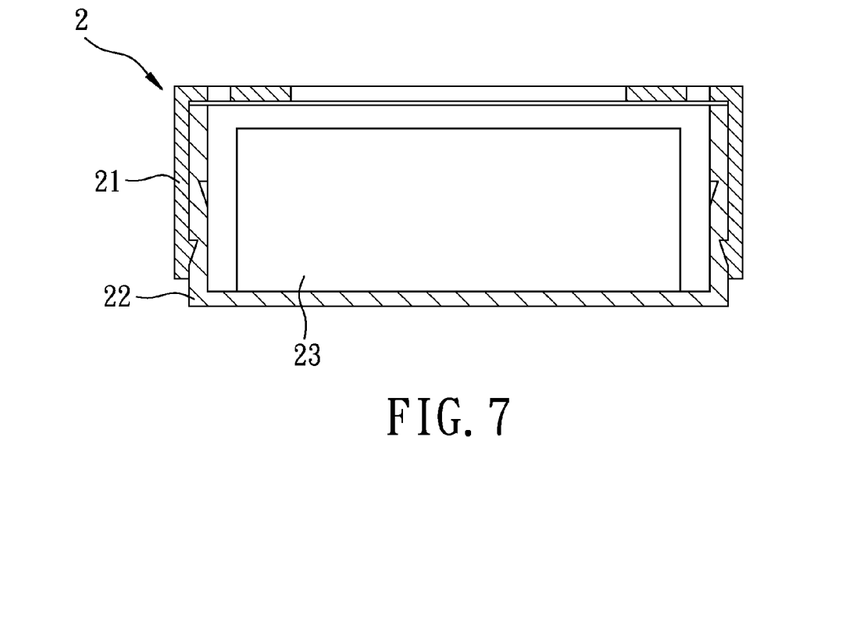
FIG. 7 is a sectional view of the backlight module of the second embodiment.

In FIG. 7, the backlight module 2 having the optical module 23, the front frame 21, and the backboard 22 is provided.

Figure 8:
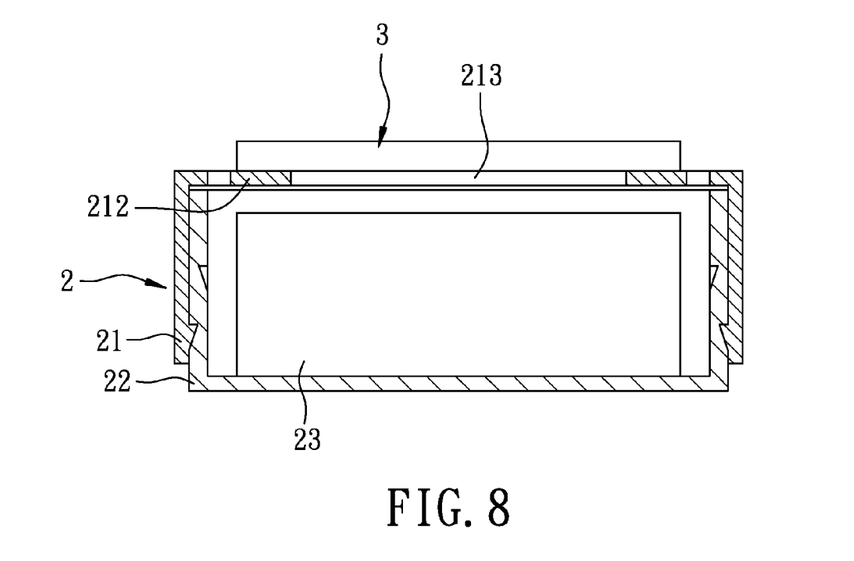
FIG. 8 is a view similar to FIG. 7, illustrating a display panel being mounted to a front side of the backlight module.

In FIG. 8, the display panel 3 having the display region 31 is mounted to the front wall 212 of the front frame 21 of the backlight module 2 to cover the frame opening 213 of the front wall 212.

Figure 9:
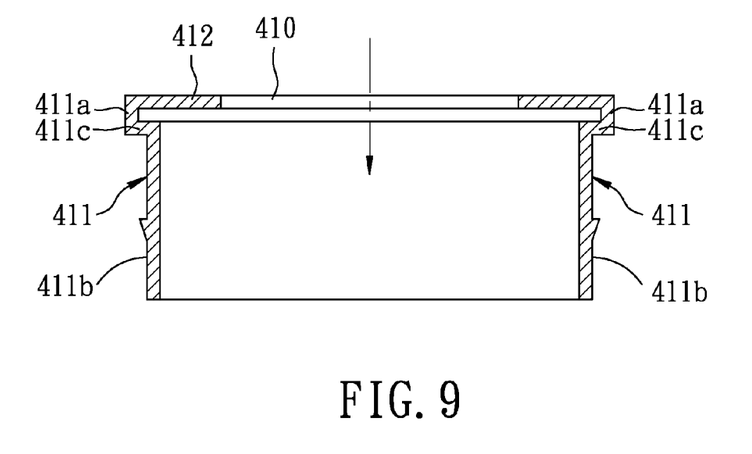
FIG. 9 is a sectional view of a front bezel of the second embodiment.

In FIG. 9, the front bezel 41 having the sidewall 411 and the front wall 412 formed with the bezel opening 410 is provided. The sidewall 411 extends rearward from the end of the front wall 412 to the bezel opening 410 along a "y" direction. In this embodiment, the first part (411a), the second part (411b), and the third part (411c) connecting in between can be formed by punching.

Figure 10:
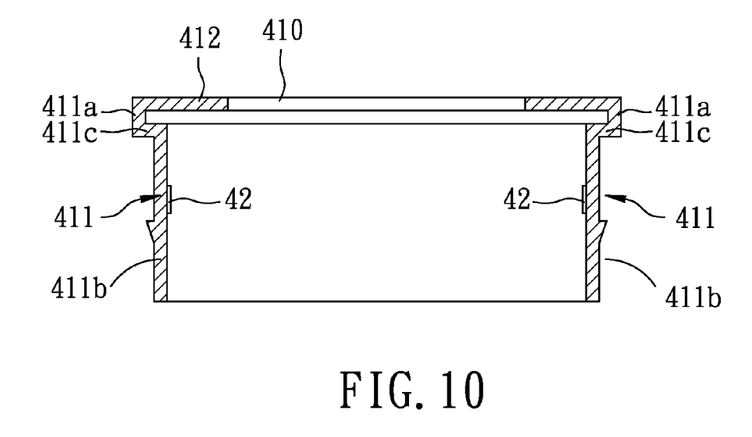
FIG. 10 is a view similar to FIG. 9, illustrating the backlight source being mounted to the sidewall of the backlight module.

In FIG. 10, the backlight source 42 is mounted to the second part (411b) of the sidewalls 411 of the front bezel 41 to form the front bezel assembly 4 of the present invention which includes the front bezel 41 and the backlight source 42. In this embodiment, the front bezel 41 may be made of metal having good thermal conductivity. The second part (411b) of the sidewall 411 is adhered with a printed circuit board (not shown). The backlight source 42 has a plurality of packaged light emitting diodes (LEDs) (not shown) mounted on the printed circuit board of the second part (411b) using a surface mount technology (SMT). The light emitting diodes are coupled electrically to the printed circuit board.

Figure 11:
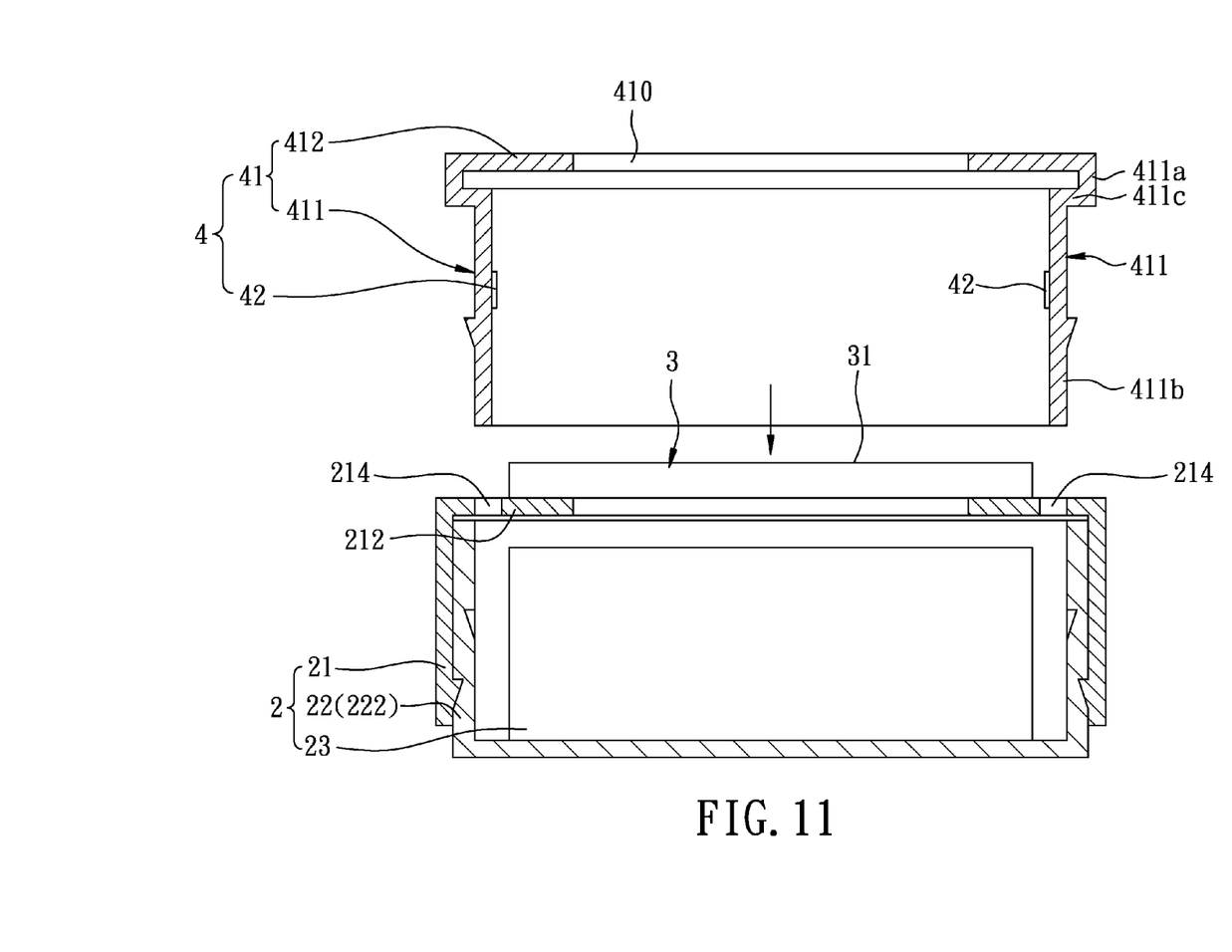
FIG. 11 is an exploded sectional view of the second embodiment, illustrating how a front bezel assembly is assembled to an assembly of the backlight module and the display panel.

In FIG. 11, the second part (411b) of the sidewall 411 is assembled to and through the slot 214 of the front wall 212, to engage the backboard surrounding wall 222 of the backboard 22. And the display region 31 of the display panel 3 can be reveal via the bezel opening 410 of the front wall 412 of the front bezel 41. Hence, the non-self-luminous display device having the front bezel assembly 4 is constructed, as best shown in FIG. 5.

From the aforesaid description, it is apparent that because the backlight source 42 in each embodiment are mounted to the sidewall 411 of the front bezel 41, if a portion of the light emitting diodes is damaged and needs to be replaced, only the front bezel 41 of the front bezel assembly 4 has to be removed from the non-self-luminous display device so as to perform removal of the damaged portion of the light emitting diodes and replacement of a new one. Hence, the replacement of the damaged light emitting diodes of the present invention is easy and convenient so that lesser time and labor are consumed as compared to that of the conventional liquid crystal display 1. Therefore, the objects of the present invention can be realized.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A non-self-luminous display device comprising:
   a backlight module;
   a display panel mounted to said backlight module; and
   a front bezel assembly including
   a front bezel including a front wall disposed in front of said display panel and formed with a bezel opening to expose said display panel, and a sidewall extending rearward from said front wall into said backlight module, and
   a backlight source mounted to said sidewall such that light emitted from said backlight source irradiates toward said display panel through said backlight module;
   wherein said sidewall includes a first part connected to and extending rearward from said front wall of said front bezel, a second part extending through said backlight module, and a third part connecting said first part and said second part;
   wherein said backlight source is mounted to said second part of said sidewall; and
   wherein said backlight module includes a front frame, a backboard and an optical module, said front frame including a front wall formed with a frame opening aligned with said bezel opening, and a frame surrounding wall extending rearward from a periphery of said front wall of said front frame, said backboard having a back wall and a backboard surrounding wall extending frontward from a periphery of said back wall and overlapping with said frame surrounding wall, said optical module being mounted to said back wall, said backboard surrounding wall being sandwiched between said frame surrounding wall and said sidewall of said front bezel, said sidewall of said front bezel being engaged to said backboard surrounding wall.

2. The non-self-luminous display device as claimed in claim 1, wherein said front wall of said front frame is further formed with a slot disposed between said frame surrounding wall and said frame opening for extension of said sidewall into said backlight module, said slot having a width that is sufficiently sized to permit said sidewall of said front bezel to move in and out of said front frame of said backlight module.

3. A method for assembling a backlight source in a non-self-luminous display device, comprising:
   a) mounting a display panel to a backlight module;
   b) providing a front bezel having a front wall formed with a bezel opening, and a sidewall extending rearward from the front wall;
   c) mounting the backlight source to the sidewall;
   d) extending the sidewall into the backlight module to engage with the sidewall; and
   e) disposing the front wall of the front bezel in front of the display panel, and exposing the display panel through the bezel opening.
   wherein, in step (b), the sidewall is stamped to form a first part, a second part, and a third part, the first part extending from one end of the front wall to the backlight module, the second part extending through the backlight module, the third part extending from one end of the first part toward the display panel and connecting one end of the second part; and
   wherein, in step (a), the backlight module includes a front frame, an optical module, and a backboard connected to the front frame, the front frame including a front wall at the front side and formed with a frame opening aligned with the bezel opening, and a frame surrounding wall extending rearward from a periphery of the front wall of the front frame, the optical module being mounted on the backboard, the backboard having a back wall and a backboard surrounding wall extending frontward from a periphery of the back wall and overlapping with the frame surrounding wall, the backboard surrounding wall being sandwiched between the frame surrounding wall and the sidewall of the front bezel, the sidewall of the front bezel being engaged with the backboard surrounding wall.

4. The method as claimed in claim 3, in step (a), wherein the front wall of the front frame is further formed with a slot disposed between the frame surrounding wall and the frame opening for extension of the sidewall into the backlight module, the slot having a width that is sufficiently sized to permit the sidewall of the front bezel to move in and out of the front frame of the backlight module.

\* \* \* \* \*